United States Patent [19]

Phillips

[11] 4,078,459
[45] Mar. 14, 1978

[54] LONG STROKE TURRET CONTROL MECHANISM FOR AUTOMATIC SCREW MACHINE

[75] Inventor: Jack R. Phillips, Dayton, Ohio

[73] Assignee: Gardner-Denver Company, Dayton, Ohio

[21] Appl. No.: 633,362

[22] Filed: Nov. 19, 1975

[51] Int. Cl.² .......................................... B23B 21/00
[52] U.S. Cl. ................................... 82/21 A; 29/42
[58] Field of Search ................. 82/21 A, 21 R, 19; 29/42, 43, 44, 64, 57; 90/38 A

[56] References Cited

U.S. PATENT DOCUMENTS

| | | | |
|---|---|---|---|
| 1,950,332 | 3/1934 | Von Pechmann | 82/19 |
| 2,790,340 | 4/1957 | Cross | 29/42 X |
| 3,262,344 | 7/1966 | Foll et al. | 82/21 A |
| 3,262,345 | 7/1966 | Spohn et al. | 82/21 A |

*Primary Examiner*—Z. R. Bilinsky
*Attorney, Agent, or Firm*—Jacox & Meckstroth

[57] ABSTRACT

Mechanism for providing and controlling long stroke turret slide movement in an automatically operable screw machine. Means are provided to obtain a longer stroke of the turret slide than is normally possible in an automatically operable screw machine. Fluid operable means control the movement of the turret slide member or turret support member with respect to a mechanically operable carrier member upon which the turret slide member rests.

6 Claims, 6 Drawing Figures

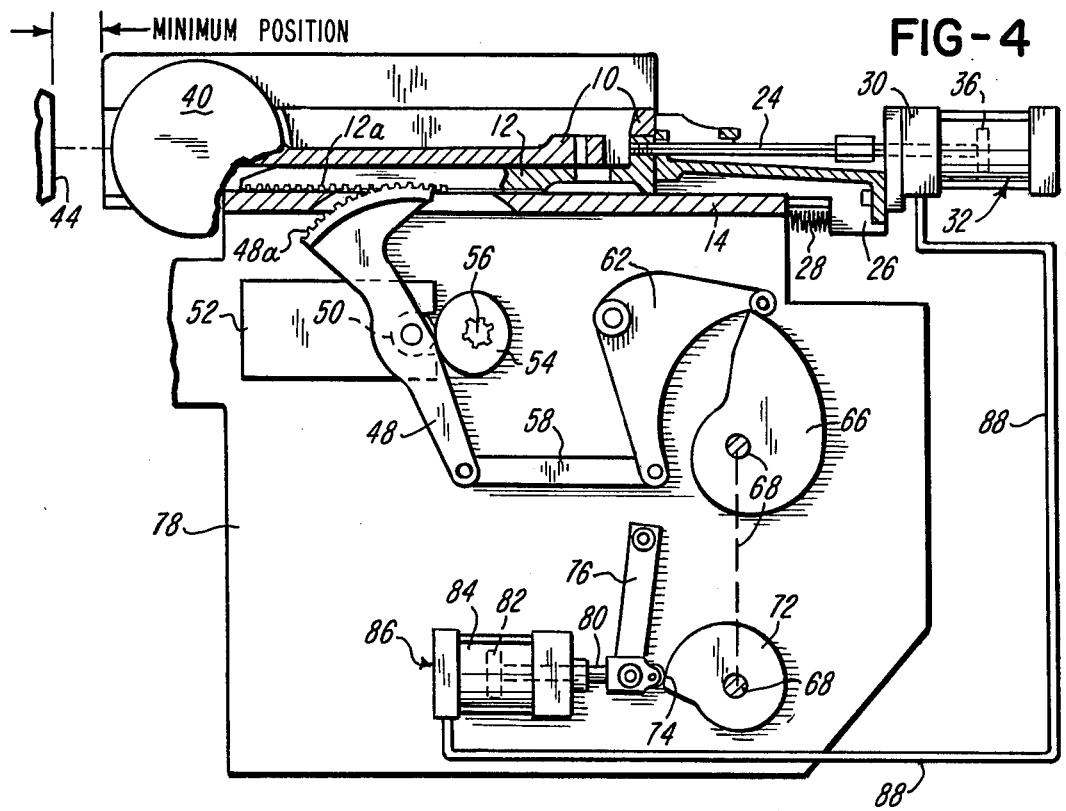
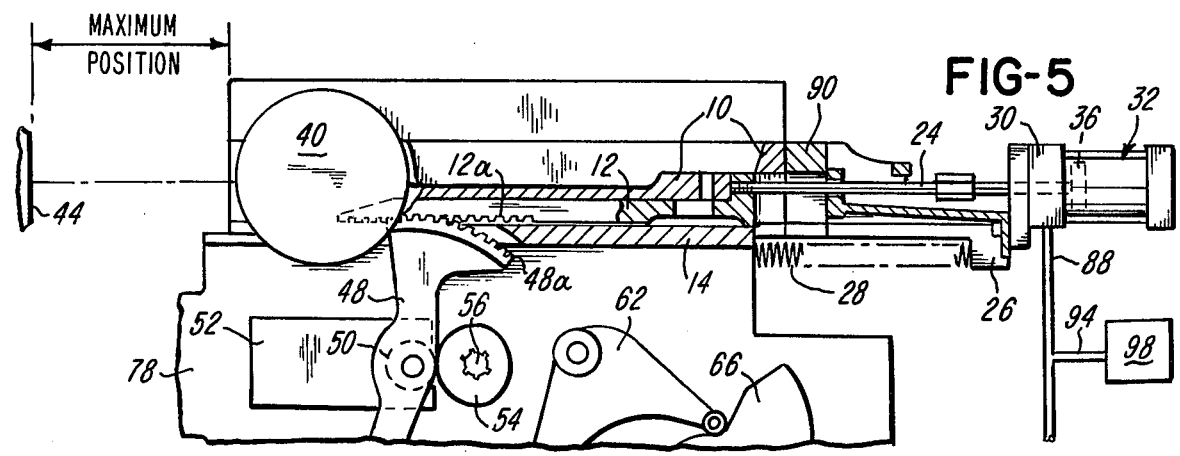
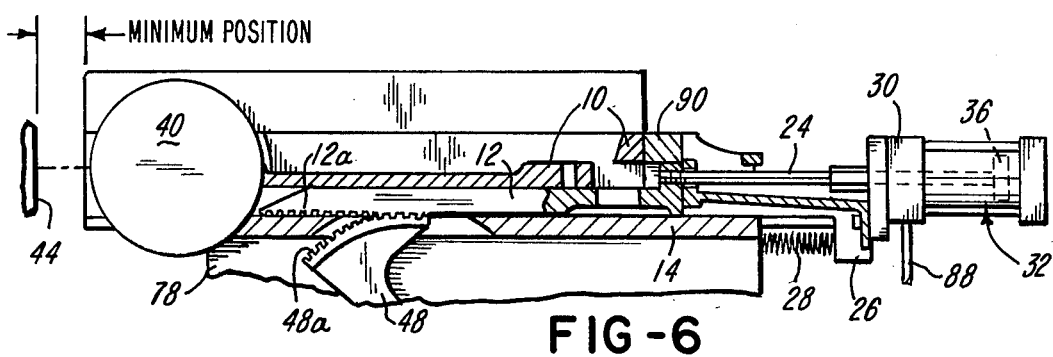

LONG STROKE TURRET CONTROL MECHANISM FOR AUTOMATIC SCREW MACHINE

BACKGROUND OF THE INVENTION

In a conventional automatically operable screw machine a turret is rotatably supported by a turret slide member or turret support member which is adjustably movable upon a gear rack or the like. The gear rack has a toothed surface and is movable by means of a pivotal lever which has a toothed portion at one end thereof which is in mesh with the toothed surface of the rack. The turret is moved toward and away from a spindle or chuck by pivotal movement of the lever, which moves the rack, which supports the support member, which supports the turret. It has been learned that there are numerous operations of an automatically operable screw machine in which a long stroke of the turret is desired. Frequently, the desired stroke of the turret is in excess of the capability of the machine.

It is an object of this invention to provide means by which a conventional automatically operable screw machine can be modified to provide for a much longer turret stroke than is otherwise possible.

It is another object of this invention to provide means by which a conventional automatically operable screw machine can be modified to produce a longer turret stroke by combining therewith a reciprocally operable motor.

It is another object of this invention to provide means by which a longer turret stroke can be obtained by combining therewith a fluid motor and by also modifying a mechanical portion of the machine.

Another object of this invention is to provide means by which the pressure which is applied by a turret tool to a work piece is sensed for indication of the pressure and/or for control of the machine.

It is another object of this invention to provide such means which is relatively low in cost and which can be readily and easily applied to a conventional screw machine.

Other objects and advantages of this invention reside in the construction of parts, the combination thereof, the method of manufacture, and the mode of operation, as will become more apparent from the following description.

SUMMARY OF THE INVENTION

The long stroke turret slide control mechanism of this invention comprises means for increased movement of a turret support member with respect to a toothed rack upon which the turret support member moves. Fluid operable actuator means are attached to the geared rack, which carries the turret support member, and to the turret support member for producing relative movement therebetween. Means are also provided for altering the location of the toothed rack with respect to a base of the machine in order to increase the normal maximum position of the turret with respect to the spindle or chuck. Means are also provided for sensing the pressure for indication and/or for control of the machine.

BRIEF DESCRIPTION OF THE VIEWS OF THE DRAWINGS

FIG. 4 is a sectional view, similar to FIGS. 2 and 3, showing the position of the elements of the apparatus when the turret is positioned at a minimum distance from the spindle.

FIG. 5 is a fragmentary diagrammatic type of sectional view illustrating a modification in the apparatus of FIGS. 2-4.

FIG. 6 is a fragmentary diagrammatic type of sectional view, similar to FIG. 5, but showing the elements of the apparatus in another position of operation.

DETAILED DESCRIPTION OF THE PREFERRED EMBODIMENTS

Figure 1:
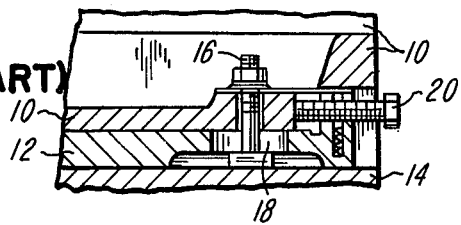
FIG. 1 is a fragmentary sectional view of a portion of a rack and turret support member of a conventional automatically operable screw machine.

A conventional automatically operable screw machine has a turret attached to a support member and the support member is adjustably carried by a toothed rack. FIG. 1 shows a portion of a conventional screw machine in which a turret support member 10 is adjustably carried upon a rack or carrier 12 which has teeth, not shown in FIG. 1, for mechanical movement thereof. The rack 12 is movable upon a way 14. A bolt 16 or the like extends through a portion of the support member 10 and also extends through an opening 18 in the rack 12. An adjustment screw 20 is carried by the rack 12 and is engageable with the support member 10 to adjust the position of the support member 10 with respect to the rack 12. The support member 10 can be adjusted with respect to the rack 12 within the limits of the opening 18 through which the bolt 16 extends. Thus, by means of the adjustment screw 20 the position of a turret, not shown, carried by the support member 10, is adjusted with respect to the rack 12 and with respect to a spindle at any position of the rack 12. The bolt 16 secures the adjusted position of the support member 10 with respect to the rack 12. Thus, the position of the support member 10 with respect to the rack 12 is maintained during reciprocal movement of the rack 12 and the support member 10. It has been found in operation of such a conventional automatically operable screw machine that the maximum or minimum spacing of a turret with respect to a spindle is not sufficient to accomplish a long stroke cutting operation, which is desired in numerous types of work.

Figure 2:
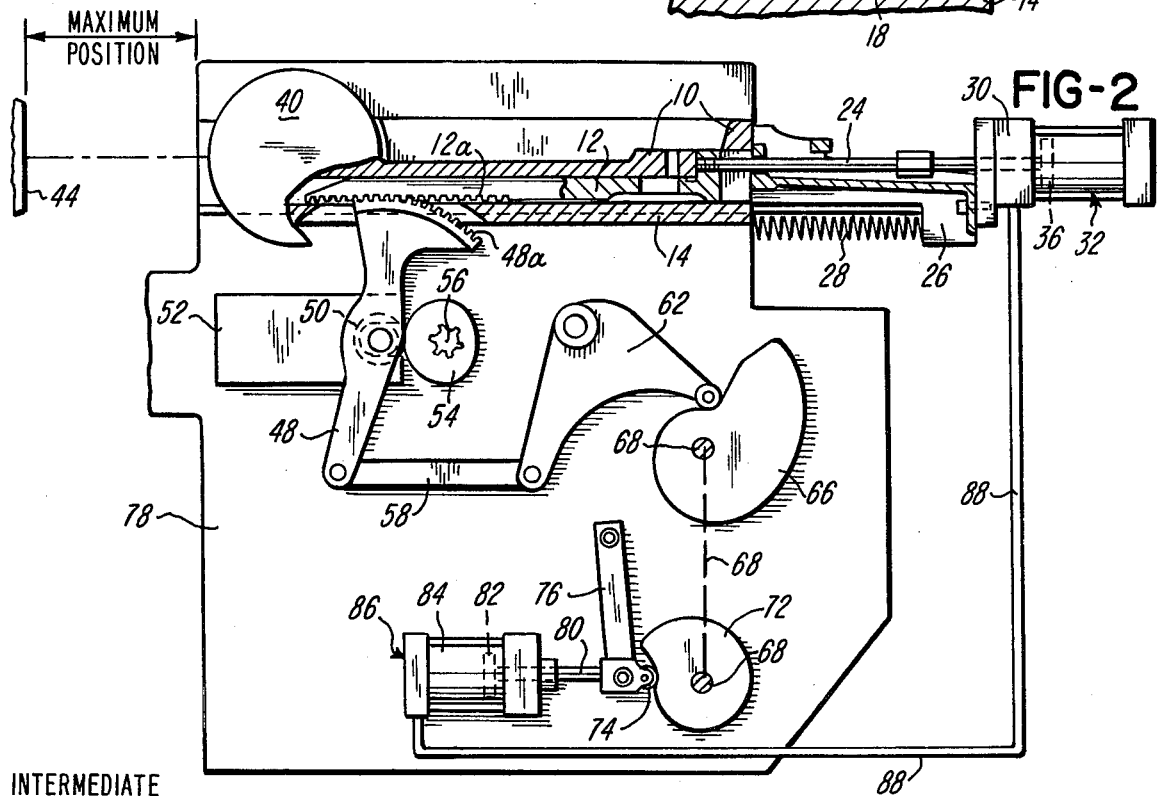
FIG. 2 is a diagrammatic type of sectional view, with parts broken away, drawn on a slightly smaller scale than FIG. 1, illustrating a modification in a conventional screw machine to provide for greater movement of the turret with respect to a spindle.
Figure 3:
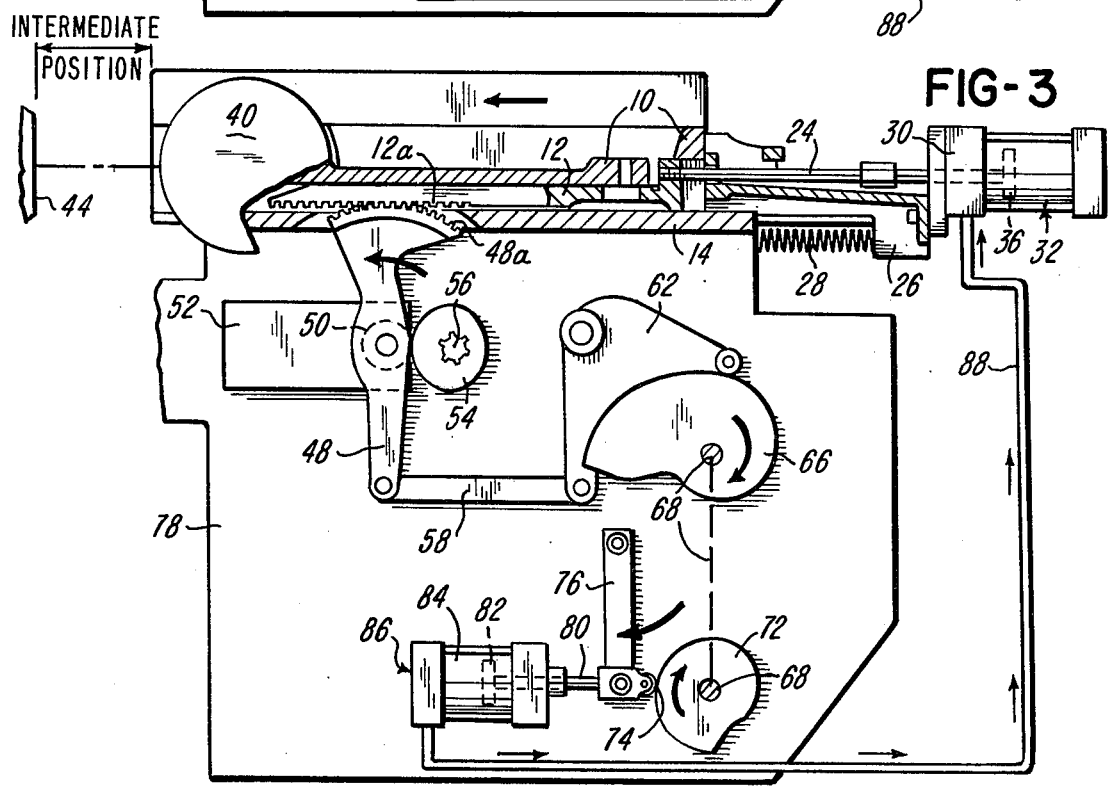
FIG. 3 is a sectional view of the apparatus of FIG. 2, showing the position of the elements of the apparatus during movement of the turret toward the spindle.

FIGS. 2, 3, and 4

FIGS. 2, 3, and 4 illustrate the manner in which a conventional automatically operable screw machine is modified in accordance with this invention to obtain a longer turret stroke than is otherwise possible. The adjustment screw 20 and the bolt 16 are removed from the support member 10 and the rack or carrier 12. An actuator rod 24 is attached to the rack or carrier 12. A bracket 26 is attached to the support member 10. The bracket 26 and the support member 10 attached thereto are shown as being urged in a direction toward the right as viewed in FIGS. 2, 3, and 4 by any suitable resilient member 28. The bracket 26 has attached thereto a fluid housing 30 of a reciprocally operable fluid motor 32. Within the fluid housing 30 is a piston 36 which is axially movable with respect thereto. The piston 36 has attached thereto the actuator rod 24.

Rotatably carried by the support member 10 is a turret 40 which, with movement of the support member 10, is movable toward and away from a spindle or chuck 44, which is adapted to retain a work piece. Thus, the support member 10 and the rack 12 serve as turret support means for movement of the turret 40.

The rack 12 has a toothed portion 12a which is in meshed engagement with a toothed portion 48a of a lever 48. The lever 48 is pivotal about a trunnion 50 which is supported by a block 52. The trunnion 50 is retained in position by a cam 54, which is rotatable about an axis 56. Pivotally attached to an end of the lever 48 opposite the toothed portion 48a, is a link 58, to which is pivotally attached a pivotal cam follower lever 62, which engages a cam 66. The cam 66 is supported by a shaft 68 and is rotatable therewith.

Also rotatable with the shaft 68 is a cam 72 which is engaged by a cam follower 74. An arm 76 is pivotally attached to the cam follower 74 and is also pivotally attached to support structure 78. The cam follower 74 is joined to a rod 80 which is attached to a piston 82 within a fluid housing 84 of a fluid pump 86. A fluid conduit 88 joins the left-hand portion of the fluid housing 84 to the left-hand portion of the fluid housing 30.

The cam 72, the cam follower 74, the arm 76, the rod 80, the piston 82, the fluid housing 84, and the fluid conduit 88, in addition to the rod 24, and the fluid motor 32, are not found in conventional screw machine and are added to a conventional screw machine in accordance with this invention.

Operation

FIG. 2 shows the rack 12 positioned at its maximum distance from the spindle or chuck 44, and the support member 10 is positioned at its maximum distance from the spindle or chuck 44. Thus, the turret 40 is positioned at a maximum distance from the spindle 44. The shaft 68 rotates in a clockwise direction and moves therewith in a clockwise direction the cam 66, as illustrated. As such rotative movement of the cam 66 occurs, the cam follower lever 62 is pivotally moved and, through the link 58, pivotally moves the lever 48 in a counter clockwise direction. The toothed portion 48a of the lever 48 in meshed relationship with the toothed portion 12a of the rack 12 causes linear movement of the rack 12 in a direction toward the spindle or chuck 44. As the rack 12 is moved toward the spindle 44, the rack 12 carries therewith the support member 10. Thus, the turret 40 and any tool carried thereby are moved toward the spindle 44. Movement of the rack 12 toward the spindle 44 moves therewith the actuator rod 24, and movement of the support member 10 towards the spindle 44 carries therewith the bracket 26 and the fluid motor 32.

As stated above and as illustrated in FIGS. 2, 3, and 4, the cam 72 is also joined to the shaft 68 for rotation therewith. Therefore, with rotation of the shaft 68 in a clockwise direction, the cam 72 rotatively moves in a clockwise direction. As the cam 72 rotatively moves in a clockwise direction, the cam follower 74 is moved toward the fluid housing 84 and the piston 82 within the fluid housing 84 is moved toward the left portion of the fluid housing 84. When this occurs, fluid within the fluid housing 84 is forced by the piston 82 in a direction from the fluid housing 84 and into the fluid conduit 88. Fluid flowing through the fluid conduit 88 from the fluid housing 84 moves into the left-hand portion of the fluid housing 30. The position of the piston 36 within the fluid housing 30 is determined by the position of the rack 12, to which the actuator rod 24 is attached. Thus, when fluid is forced into the fluid housing 30 through the fluid conduit 88, the fluid housing 30 is forced to move toward the spindle 44 and to move in this direction with respect to the piston 36. Thus, when fluid is forced into the fluid housing 30 the support member 10 moves toward the spindle 44. Such movement of the support member 10 is with respect to the rack 12.

Therefore, as the shaft 68 rotates from the position thereof shown in FIG. 2 to an intermediate position shown in FIG. 3, the rack 12 is moved by the lever 48 toward the spindle 44 to an intermediate position, as shown in FIG. 3, and, at the same time, the support member 10 is moved forwardly toward the spindle 44 to an intermediate position with respect to the rack 12. Furthermore, when the lever 48 has moved the rack 12 toward the spindle 44 to the maximum travel, as determined by the toothed portions 48a and 12a, as illustrated in FIG. 4, the fluid motor 32 has moved the support member 10 with respect to the rack 12 the maximum travel as determined by the position of the bracket 26 with respect to the rack 12, as the bracket 26 comes into engagement with the rack 12, as shown in FIG. 4. Thus, the turret 40 is moved from a maximum position with respect to the spindle 44, as shown in FIG. 2, to its minimum distance with respect to the spindle 44, as shown in FIG. 4. Such travel of the turret 40 is greater than maximum travel obtainable in a conventional apparatus illustrated in FIG. 1. This is due to the fact that the maximum fixed adjustment of the support member 10 with respect to the rack 12 has been changed to an operational travel of the support member 10 with respect to the rack 12.

It is to be understood that the rack 12 and the support member 10 can be operated in accordance with this invention in a manner such that complete travel of the rack 12 is completed before or after complete travel of the support member 10 with respect to the rack 12 toward the spindle 44.

The cam 54 serves as a withdrawal cam for rapid withdrawal of the turret 40 with rotative movement of the cam 54, which permits the spring 28 to move the trunnion 50 to the right and thus to move the pivotal axis of the lever 48 and the rack 12 to the right.

FIGS. 5 and 6

FIGS. 5 and 6 illustrate further modification of a conventional screw machine for the purpose of obtaining greater travel or stroke of the turret 40. As shown in FIG. 5, the turret 40 is moved to a maximum distance from the spindle 44. This distance is greater than the maximum distance of the turret 40 from the spindle 44 shown in FIG. 2. In the apparatus as shown in FIG. 5 the pivotal axis of the lever 48 is moved toward the right by movement of the trunnion 50 to the right. In order to obtain this movement of the trunnion 50 to the right, the cam 54 is reduced in size or moved to the right. Thus, the toothed portion 48a of the lever 48 is moved farther to the right and the rack 12 is moved farther to the right. Movement of the rack 12 farther to the right permits movement of the support member 10 farther to the right. Thus, the turret 40 is moved to the right from the position thereof, shown in FIG. 2, to the position thereof shown in FIG. 5. Thus, the turret 40 has a maximum spaced position from the spindle 44 greater than the maximum spacing of the turret 40 from the spindle 44 possible in the apparatus as shown in FIGS. 2, 3, and 4. FIG. 5 shows a modification by insertion of a spacer block 90 between the bracket 26 and the support member 10, in order to provide greater spacing between the bracket 26 and the rack 12. This can also, of course, be accomplished by reshaping the bracket 26 to permit greater travel of the support member 10 with respect to the rack 12. Thus, in operation of the apparatus of FIGS. 5 and 6 the turret 40 begins its travel toward the spindle 44 from a position farther from the spindle 44 than is possible with the apparatus shown in FIG. 2.

In operation, as the lever 48 is pivotally moved, through rotative movement of the cam 66, the rack 12 is moved toward the spindle 44. As the rack 12 travels toward the spindle 44, the cam 72, rotatively moving with the cam 66 and operating upon the piston 82, forces fluid into the fluid housing 30. The fluid housing 30, attached to the support member 10, forces the support member 10 to move toward the spindle 44 with respect to the rack 12. Thus, the support member 10 is moved forwardly with respect to the rack 12 until the bracket 26 engages the rack 12, as shown in FIG. 6. This travel of the support member 10 with respect to the rack 12 is greater than the travel possible with the apparatus as shown in FIGS. 2, 3, and 4. This is due to the fact that the turret 40 is moved from a maximum position spaced farther from the spindle 44 to a minimum position equal to that shown in FIG. 4. Thus, the travel or stroke of the turret 40 is greater than the travel or stroke of the turret 40 in the apparatus as shown in FIGS. 2, 3, and 4.

Also shown in FIG. 5 is a connector fluid conduit 94 which joins the fluid conduit 88 to a unit 98. The unit 98 senses the fluid pressure in the fluid conduit 88. The fluid within the fluid motor 32 forces a tool carried by the turret 40 into engagement with a work piece which is retained by the spindle or chuck 44. Thus, the pressure of the fluid within the fluid motor 32 and within the fluid conduit 88 is directly related to the force required to effect operation upon a work piece by a tool carried by the turret 40. Thus, the unit 98 senses the force required to effect operation upon a work piece by a tool carried by the turret 40. When a tool carried by the turret 40 wears or breaks, the pressure applied to a work piece by the tool increases. Such increase may be sudden or gradual. Thus, the pressure increase sensed by the unit 98 may be sudden or gradual. The unit 98 may be an indicator which indicates pressure, so that an operator when observing the pressure increase above a given value stops the screw machine from further operation. The unit 98 may be a pressure sensitive switch element which is joined to means for controlling or for stopping the screw machine when fluid pressure of a predetermined magnitude exists within the fluid conduit 88. Thus, the unit 98 is employed to protect the screw machine from damage which may result from worn or broken turret tools. The protection may be automatic or visual and manual.

Although the preferred embodiment of the device has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

The invention having thus been described, the following is claimed:

1. In an automatically operable screw machine, a spindle, a toothed rack linearly movable toward and away from the spindle, a turret support member carried by the toothed rack and linearly movable with the rack toward and away from the spindle, the turret support member also being relatively linearly movable with respect to the toothed rack toward and away from the spindle, a pivotal lever having a toothed portion in meshed relationship with the toothed rack for movement thereof, first rotary cam means, the first rotary cam means being operably joined to the pivotal lever for pivotal movement thereof, the improvement comprising:

a bracket attached to the turret support member for movement therewith, a linearly reciprocatingly operable fluid motor having a housing attached to the bracket for simultaneous movement of the turret support member and the housing, the fluid motor also including a piston within the housing, the piston and the housing being relatively axially movable, an actuator rod attached to the piston and movable therewith, the actuator rod being attached to the rack for simultaneous movement of the piston rod and the rack, second rotary cam means, means joining the second rotary cam means to the first rotary cam means for rotary movement of the second rotary cam means with rotary movement of the first rotary cam means, a linearly reciprocatingly operable fluid pump, the fluid pump including a housing and a piston within the housing, the housing and the piston being relatively axially movable, means joining the linearly reciprocatingly operable fluid pump to the second cam means for relative axial movement between the piston and housing of the linearly reciprocatingly operable fluid pump by rotary movement of the second cam means, fluid conduit means joining the linearly reciprocatingly operable fluid pump to the linearly reciprocatingly operable fluid motor for relative movement between the housing and piston of the fluid motor in direct relationship to relative movement between the piston and housing of the fluid pump, rotary movement of the first rotary cam means thus operably pivoting the pivotal lever, and rotary movement of the second rotary cam means operating the fluid pump with rotary movement of the first rotary cam means, the toothed rack thus being movable toward the spindle through pivotal movement of the pivotal lever and by rotary movement of the first rotary cam means, the turret support member thus being moved toward the spindle as the turret support member is carried by the rack toward the spindle, the turret support member also being moved with respect to the toothed rack toward the spindle through rotary movement of the second cam means and through relative movement between the piston and the housing of the fluid pump and through relative movement between the piston and the housing of the fluid motor.

2. In combination with an automatically operable metal working machine provided with a spindle adapted to carry a work piece, a carrier movable toward and away from the spindle, a tool holder support member carried by the carrier, the support member being movable with respect to the carrier toward and away from the spindle, a tool holder carried by the tool holder support member, a metal cutting tool carried by the tool holder, mechanical means for movement of the carrier toward and away from the spindle for engagement and disengagement of the tool with respect to the work piece, means for providing long stroke movement of the tool holder, comprising:

a linearly operable fluid motor, means joining the linearly operable fluid motor to the tool support member and to the carrier for relative movement therebetween toward and away from the spindle, a linearly operable fluid pump, means operably joining the linearly operable fluid pump to the mechanical means, for linear operation of the fluid pump by operation of the mechanical means, fluid conduit means joining the linearly operable fluid pump to the linearly operable fluid motor for flow of fluid from the fluid pump to the fluid motor for linear operation of the fluid motor in direct response to linear operation of the fluid pump, the tool holder and the tool carried thereby thus being movable toward the spindle as the tool holder support member is carried by the carrier toward the spindle as the carrier is moved by the mechanical means, the tool holder support member also being simultaneously movable toward the spindle by movement of the tool holder support member with respect to the carrier through operation of the fluid motor with operation of the fluid pump as the fluid pump is operated by the mechanical means.

3. The automatically operable screw machine of claim 2 in which the means for providing long stroke movement of the tool holder includes fluid pressure sensing means in communication with the fluid conduit means and sensing the fluid pressure within the fluid conduit means, thus sensing fluid pressure within the fluid motor in response to forces exerted by the tool upon a work piece, thus sensing the forces applied by the tool upon a work piece retained by the spindle.

4. In an automatically operable machine tool having a rotatable spindle, a toothed rack linearly movable toward and away from the spindle, a toothed pivotal lever in meshed engagement with the toothed rack for linear movement of the toothed rack with pivotal movement of the toothed pivotal lever, a first rotary cam member, cam follower means operably joined to the toothed pivotal lever and to the first rotary cam member for pivotal movement of the toothed pivotal lever with rotative movement of the first rotary cam member, a turret support member carried by the toothed rack and movable therewith toward and away from the spindle, the turret support member also being movable with respect to the toothed rack toward and away from the spindle, the improvement comprising:

a second rotary cam member, means joining the second rotary cam member to the first rotary cam member for rotation of the second rotary cam member with rotation of the first rotary cam member, a reciprocatingly operable fluid pump provided with a housing having a linearly movable piston therein, a piston rod attached to the piston and having an engagement portion exterior of the housing and in engagement with the second rotary cam member for operation of the fluid pump by linear movement of the piston by rotational movement of the second rotary cam member, a reciprocatingly operable fluid motor provided with a housing and a piston within the housing, the housing and the piston of the fluid motor being relatively linearly movable, means attaching the piston to the toothed rack, means attaching the housing to the turret support member, and fluid conduit means joining the fluid pump to the fluid motor for flow of fluid therebetween for relative movement between the piston and the housing of the fluid motor in direct relationship to linear movement of the piston of the fluid pump, for movement of the turret support member toward the spindle and with respect to the toothed rack during simultaneous movement of the toothed rack toward the spindle by movement of the toothed pivotal lever.

5. In an automatically operable machine tool having a rotatable spindle, a toothed rack linearly movable toward and away from the spindle, a toothed pivotal lever in meshed engagement with the toothed rack for linear movement of the toothed rack with pivotal movement of the toothed lever, a first rotary cam member, cam follower means operable with the toothed lever and the first rotary cam member for pivotal movement of the toothed lever with rotative movement of the first rotary cam member, a turret support member carried by the toothed rack and movable therewith toward and away from the spindle, the turret support member also being movable with respect to the toothed rack toward and away from the spindle, the improvement comprising:

a second rotary cam member, means joining the second rotary cam member to the first rotary cam member for rotation of the second rotary cam member with rotation of the first rotary cam member, a linearly reciprocatingly operable fluid pump including cam follower means in engagement with the second rotary cam member for operation of the linearly reciprocatingly operable fluid pump by rotational movement of the second rotary cam member, a linearly reciprocatingly operable fluid motor provided with a housing portion and a piston portion, the housing portion and the piston portion being relatively linearly movable, fluid conduit means joining the fluid pump to the fluid motor for flow of fluid therebetween for relative linear movement between the housing portion and the piston portion of the fluid motor by linear operation of the fluid pump, the relative linear movement between the housing portion and the piston portion of the fluid motor being in direct relationship to linear operation of the fluid pump, means attaching one of the portions of the fluid motor to the toothed rack, and means attaching the other portion of the fluid motor to the turret support member, the turret support member thus being relatively movable toward the spindle with respect to the toothed rack while simultaneously being carried toward the spindle by the toothed rack.

6. An automatically operable machine for operation upon a work piece, the machine being provided with a turret support member having linear movement toward and away from the work piece, a reciprocally movable toothed rack movable toward and away from the work piece and in supporting relationship to the turret support member, a pivotal lever having a toothed portion in meshed relationship with the toothed rack for movement thereof toward and away from the work piece, rotary cam means operably joined to the pivotal lever for pivotal movement thereof, the toothed rack being movable by the rotary cam means to a given position spaced from the work piece, the turret support member being movable toward the work piece by the toothed rack, the turret support member being movable with respect to the toothed rack toward the work piece, the improvement comprising:

a fluid pump,
means operably joining the fluid pump to the rotary cam means for operation of the fluid pump by rotative movement of the rotary cam means and in direct relationship to rotary movement of the rotary cam means, fluid motor means, means connecting the fluid motor means to the turret support member and to the toothed rack for relative movement of the turret support member with respect to the toothed rack, fluid conduit means joining the fluid motor means to the fluid pump means for operation of the fluid motor means in direct relationship to operation of the fluid pump means, the toothed rack thus being moved toward the work piece by pivotal movement of the pivotal lever which is pivotally moved by the rotary cam means, the turret support member being moved toward the work piece by the toothed rack and be relative movement between the toothed rack and the turret support member by the fluid motor means which operates in direct relationship to operation of the fluid pump means and the rotary cam means, the minimum and maximum positions of the turret support member with respect to the work piece thus being dependent upon the position of the toothed rack with respect to the work piece and the relative position of the turret support member with respect to the toothed rack.

* * * * *

UNITED STATES PATENT AND TRADEMARK OFFICE
CERTIFICATE OF CORRECTION

PATENT NO. : 4,078,459
DATED : March 14, 1978
INVENTOR(S) : Jack R. Phillips

It is certified that error appears in the above-identified patent and that said Letters Patent are hereby corrected as shown below:

Column 10, line 16, change "be" to ---by---.

Column 3, line 35, after the word "in" add ---a---.

Signed and Sealed this

Twenty-ninth Day of August 1978

[SEAL]

Attest:

RUTH C. MASON
*Attesting Officer*

DONALD W. BANNER
*Commissioner of Patents and Trademarks*